United States Patent [19]

Myers et al.

[11] Patent Number: 5,557,084
[45] Date of Patent: Sep. 17, 1996

[54] TEMPERATURE COMPENSATING FUEL DISPENSER

[75] Inventors: Howard M. Myers, Greensboro; Charles W. VonCannon, Colfax, both of N.C.

[73] Assignee: Gilbarco Inc., Greensboro, N.C.

[21] Appl. No.: 279,174

[22] Filed: Jul. 22, 1994

[51] Int. Cl.$^6$ .................................................. B67D 5/22
[52] U.S. Cl. ........................ 235/94 A; 222/1; 222/26; 222/54
[58] Field of Search ........................ 222/23, 25, 26, 222/54–55, 52; 235/94 R, 94 A; 73/861.01, 861.02, 861.03, 204.19, 861; 250/231.14

[56] References Cited

U.S. PATENT DOCUMENTS

| | | |
|---|---|---|
| 1,828,170 | 7/1931 | Bristol . |
| 3,530,715 | 12/1970 | Stiens ........................................ 73/233 |
| 3,871,503 | 3/1975 | Greenwood . |
| 4,056,717 | 11/1977 | Cornforth . |
| 4,101,056 | 3/1978 | Mattimoe et al. ........................ 222/26 |
| 4,162,027 | 7/1979 | Howard et al. . |
| 4,530,247 | 7/1985 | Haas ........................................ 73/861 |
| 4,798,092 | 1/1989 | Lagergren et al. . |
| 5,029,622 | 7/1991 | Mutter ..................................... 222/54 X |
| 5,205,161 | 11/1993 | Erwin ....................................... 73/114 |

FOREIGN PATENT DOCUMENTS

| | | |
|---|---|---|
| 0049919 | 4/1982 | European Pat. Off. . |
| 2016916 | 12/1970 | Germany . |
| 1263854 | 2/1972 | United Kingdom . |

Primary Examiner—Gregory L. Huson
Attorney, Agent, or Firm—Rhodes Coats & Bennett, L.L.P.

[57] ABSTRACT

An apparatus the dispensing a liquid fuel and measuring the amount dispensed according to a temperature-corrected volumetric measure includes a housing having a fuel-handling compartment and an electronics compartment and a barrier between the fuel handling compartment and the electronics compartment, a plurality of fuel passageways through the fuel-handling compartment, each passageway having a flow meter to measure the volume of fuel flowing through the passageway and a thermometric probe adapted to read the temperature of fuel flowing through the passageway, each of the meters being connected by a first electrical circuit to pass an electrical signal representative of the volumetric flow through its respective passageway onto the first circuit, each of the probes being connected by a second electric circuit to pass an electrical signal representative of the temperature of the probe onto the second circuit, the second circuit having one intrinsically safe passage through the barrier, and electronics in the electronics compartment including a computation device connected to the circuits to receive the electric signals and to modify the electrical signal representative of the volumetric flow to account for temperature.

55 Claims, 7 Drawing Sheets

TEMPERATURE COMPENSATING FUEL DISPENSER

BACKGROUND OF THE INVENTION

The present invention relates to improvements in fuel dispensers to permit compensation of the measured amount of fuel dispensed to compensate for temperature fluctuations. As is known from elementary physics, the volume of most objects is dependent on temperature, with most things expanding when heated and contracting when cooled. This is true of liquid fuels like gasoline.

Since liquid fuels are typically sold by a volumetric measure, such as U.S. gallons, Imperial gallons, or liters, the mass of fuel sold in, for example, a U.S. gallon at 30 degrees Fahrenheit will differ from the mass sold at 90 degrees Fahrenheit. Since the actual fuel value will be dependent on the mass, the fuel value of the transaction is temperature dependent. Various governmental bodies with oversight over commercial weights and measures have from time to time required this to be taken into account, as reported in U.S. Pat. No. 4,101,056 to Mattimoe, the entire disclosure of which is incorporated herein by reference. However, this is a problem that has not been addressed to provide a commercially viable, temperature-compensating fuel dispenser. The issue is to make the amount sold by volume be normalized to a standard temperature, so that, for example, even at 30 degrees F., the fuel value sold as a gallon is the same as a 60 degree gallon.

One of the problems encountered is the problem of taking an accurate temperature. Obviously, there are a number of factors that affect the temperature of fuel, including the ambient temperature, prior ambient temperatures, insulation of the fuel from the ambient, possible heating by the pumping of the fuel, and the like. Also, the temperature must be taken on a real time basis, since there can be inhomogeneities in the temperatures of stored fuel, so that the actual temperature of the fuel may vary during a fueling transaction. Finally, the fact that the product involved is highly flammable must be taken into consideration. Any sparking or arcing in electronic components used to take the temperature could be disastrous.

The requirement to accurately sense temperature at several temperatures in a hazardous location imposes several constraints. Since the temperature sensors are in the vicinity of the gasoline, the sensors must either be intrinsically safe or explosion-proof to meet requirements of safety agencies. The problems with an explosion-proof system are cost of conduit or mineral insulation cable, difficulty in handling during installation, and finding space to locate an explosion-proof box. Explosion-proof items are generally very large and heavy. Multiple explosion-proof sensors further complicates a congested hydraulic area, and would be very difficult to retrofit.

The temperature readings require a high degree of accuracy and stability to maintain Weights and Measures authorities' approvals. As a result, it is valuable to have a system which provides temperature measurements with minimal error for an indefinite time period. The electronic and mechanical components will drift with time and temperature, causing associated drifts in temperature readings. While this could by compensated with trim settings and other calibrations for gain and zero adjustments, these can be misadjusted, can also change over time, and require time, tools and equipment to adjust.

Accordingly there is a need in the art for a precise, trouble-free, reliable, verifiable dispenser that corrects volume readings to compensate for temperature fluctuations.

SUMMARY OF THE INVENTION

The present invention fulfills this need in the art by providing an apparatus for dispensing a liquid fuel and measuring the amount dispensed according to a temperature-corrected volumetric measure including a housing having a fuel-handling compartment and an electronics compartment and a barrier between the fuel handling compartment and the electronics compartment. A plurality of fuel passageways extend through the fuel-handling compartment, each passageway having a flow meter to measure the volume of fuel flowing through the passageway and a thermometric probe adapted to read the temperature of fuel flowing through the passageway. Each of the meters is connected by a first electrical circuit to pass an electrical signal representative of the volumetric flow though its respective passageway onto the first circuit, the first circuit having an intrinsically safe passage through the barrier. Each of the probes is connected by a second electric circuit to pass an electrical signal representative of the temperature of the probe onto the second circuit, the second circuit having an intrinsically safe passage through the barrier. Electronics in the electronics compartment include a computation device connected to the circuits to receive the electric signals and to modify the electrical signal representative of the volumetric flow to account for temperature.

In one embodiment the flow meters include a meter housing and the thermometric probe is mounted in a removable endwall of the meter housing. Preferably, the endwall also includes a well adapted to receive a second probe to check the accuracy of the first-mentioned probe in the endwall. The probe is typically a resistance temperature detector (RTD) probe.

In a preferred embodiment an electronics package is electrically connected to the probes and to reference resistors to sequentially pass a pulse of current from a current source through each of the probes and the resistors to generate data and reference signals. The electronics package multiplexes the data and reference signals for transmission to the electronics compartment.

The electronics package may convert the data and reference signals to a pulse-width modulated form. If so, it is preferred that the pulses of the converted data and reference signals are on the order of 20–50 milliseconds long. The electronics compartment may include an electrical filter to filter high frequency transients from the data and reference signals.

Preferably, there are at least four of the probes electrically connected to the electronics package. The electronics package may include a sawtooth waveform generator and a comparator to compare the voltage across one of the probes with a sawtooth waveform to generate pulses of a length derived from the resistance of the probe.

Preferably, one of the reference resistors has a resistance corresponding to the resistance of the probes at an extreme end of a range of expected temperatures, and the other of the reference resistors has a resistance corresponding to the resistance of the probes at an opposite extreme end of the range of expected temperatures. In a preferred embodiment the data and reference signals are transmitted to the electronics compartment and the temperatures of the probes are computed by interpolation of the data signals and the reference signals. Error from non-linearity of the resistance of the probes can be compensated by use of a lookup table of values of resistance for temperatures in the expected temperature range, and finding connected values in the table for interpolation.

The invention also provides a method of dispensing liquid fuel and measuring the amount dispensed according to a temperature-corrected volumetric measure including passing the fuel through one of a plurality of fuel passageways in a hazardous area of a fuel dispenser, generating a signal representative of the volume of flowing fuel in the passageway, generating a signal representative of the temperature of fuel flowing through the passageway, passing the signal representative of the volumetric flow through an intrinsically safe passage through a barrier to a non-hazardous area, and modifying the signal representative of the volumetric flow to account for temperature.

In one embodiment the method includes temporarily inserting a temperature probe juxtaposed the passageway to check the accuracy of the signal representative of the temperature of fuel flowing through the passageway.

Preferably, the method includes sequentially passing a pulse of current from a current source through each of several probes and reference resistors to generate data signals representative of the temperature of fuel flowing through the passageway and other passageways and to generate reference signals. The method may include multiplexing the data and reference signals for transmission through the intrinsically safe passage through the barrier to the non-hazardous area.

The method may also include converting the data and reference signals to a pulse-width modulated form with the pulses on the order of 20–50 milliseconds long. In the method high frequency transients may be filtered from the data and reference signals in the non-hazardous area.

Preferably, the sequential passing step includes passing current pulses through at least four probes. The method may include generating a sawtooth waveform and comparing the voltage across the probes with a ramp voltage of the sawtooth waveform to generate pulses of a length derived from the resistances of the probes. Preferably, the step of passing a current pulse through the reference resistors generates a voltage corresponding to the voltage across one of the probes at an extreme end of a range of expected temperatures. Also, the current through the other reference resistor generates a voltage corresponding to the voltage across one of the probes at an other end of a range of expected temperatures. Preferably, the temperatures of the probes are computed by interpolation of the data signals and the reference signals. Also preferably, error from non-linearity of the resistance of the probes can be compensated by use of a lookup table of values of resistance for temperatures in the expected temperature range, and finding corrected values in the table for interpolation.

BRIEF DESCRIPTION OF THE DRAWINGS

The invention will be better understood after a reading of the Detailed Description of the Preferred Embodiments and a review of the drawings in which.

DETAILED DESCRIPTION OF THE PREFERRED EMBODIMENTS

Figure 1:
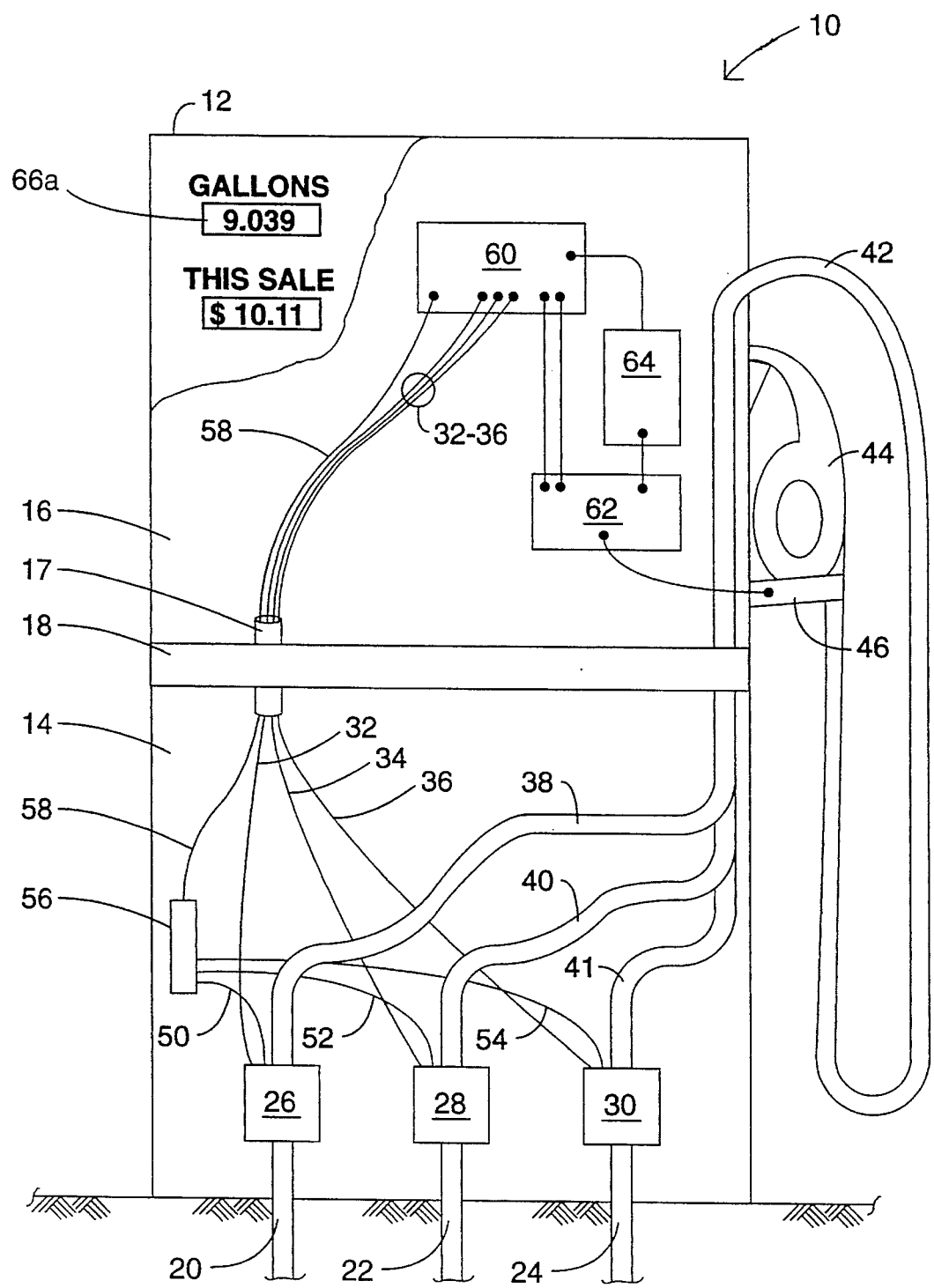
FIG. 1 is a partially broken-away view of a fuel dispenser according to a preferred embodiment of the invention showing inner components in schematic form.

Referring to FIG. 1, there is shown a fuel dispenser 10 of conventional design, except as described herein. In particular, the dispenser 10 can take the form of a modified version of a Gilbarco THE ADVANTAGE® dispenser sold by Gilbarco, Inc. of Greensboro, N.C. The housing 12 is divided into a fuel handling compartment 14 and an electronics compartment 16 by a barrier 18. The dispenser 10 is shown mounted on the ground with pipe fittings 20,22,24 extending upwardly frown underground tanks to supply liquid fuel, typically gasoline, to the dispenser. The inlet pipes 20,22,24 have respective meters 26,28,30 in line with them and supplying downstream pipes 38,40,41. The downstream pipes each leads to a hose 42 (only one of which is shown for sake of simplicity) terminating in a nozzle 44. The nozzle 44, when not in use, rests on a nozzle rest/handle 46. When fuel is to be pumped, the nozzle 44 is removed from the dispenser housing 12 and the handle 46 is lifted, closing a switch, which is indicated to hydraulic interface board 62 in conventional fashion.

Figure 3:
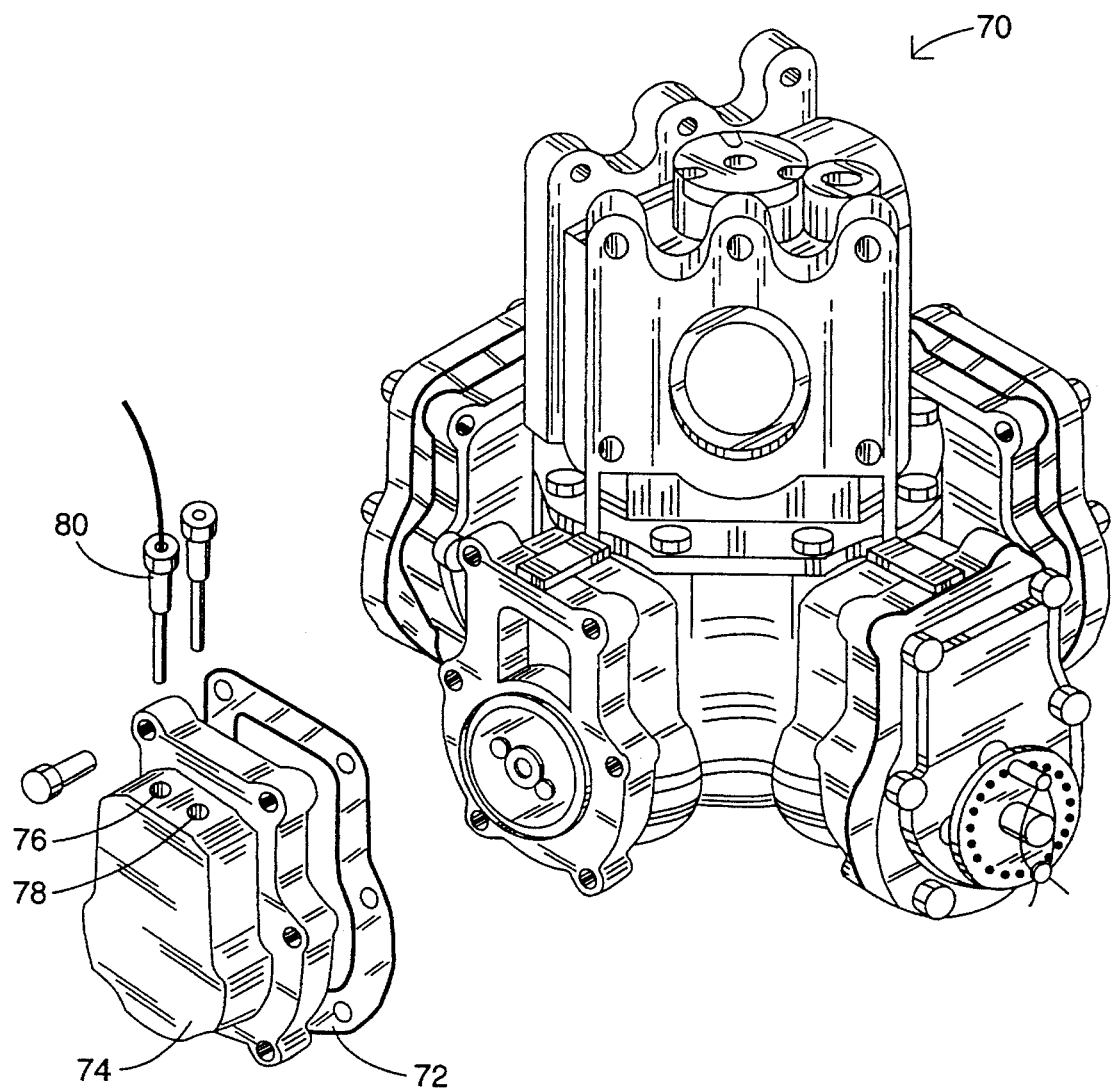
FIG. 3 is a perspective view, partly exploded, of a preferred meter embodiment.

The metering devices 26,28,30 are preferably in a conventional form of a meter with an attached pulser. The meter is modified slightly as shown in FIG. 3, as will be discussed in further detail hereinbelow. Each of the pulsers supplies an output signal indicative of the liquid flow rate through the meters over lines 32,34,36. These are communicated to an automatic temperature compensation board 60 in the top of the housing 12. Intrinsically safe passages 17 in the barrier 18 allow communication over the electrical wires from the fuel handling compartment 14 to the electronics compartment 16. The barrier 18 is a conventional design, as used in THE ADVANTAGE® dispensers sold by Gilbarco, Inc., provided for the purpose of providing a safety separation between components below the barrier which actually handle the flammable liquid fuel and the electronics above the barrier. This increases the safety by an added level of protection. An electronics failure causing a spark will be less likely to ignite any fuel vapor. The passage 17 is an electronic circuit that includes voltage limiting devices such a Zener diodes, and current limiting devices, such as resistors or fuses, as noted in FIG. 5. Thus, a fault in the circuit could only pass a limited amount of power to the components below the barrier 18.

In a preferred embodiment, not shown, the pulsers are affixed to the meters using the technique employed in THE ADVANTAGE® dispensers sold by Gilbarco, Inc. and well known to the art. In this type of dispensers, each meter is below the barrier 18 and its associated pulser is above the barrier 18. A shaft rotated by the meter passes through the barrier to drive the pulser. Thus, the lines 32–36 from the pulsers to the board 60 are located solely above the barrier 18.

Each of the metering devices 26–30 is also supplied with electrical connection 50,52,54 to a T-meter board 56 in the fuel handling compartment. The connections 50–54 provide indicia of the temperature of the liquid fuel passing through the respective metering devices 26–30, as will be discussed in greater detail hereinafter. The T-meter board 56 combines the data from the lines 50–54 into a serial pulsewidth modulated form and communicates this signal along line 58 through the intrinsically safe passage 17 to the ATC board 60.

The ATC board is also provided with connections to hydraulic interface board 62 and pump-controller board 64 which, in turn, is connected to the hydraulic interface board 62. An output of the board 60 is applied to the visual display 66a on the outside of the housing to show the customer the correct volumetric reading of the fuel being purchased. A similar display 66b on the other side of the dispenser (not shown in FIG. 1) receives data pertinent to the hoses on that side. Of course, the connected volumetric data can also be supplied to any of various remote consoles and the like as are conventional in modern fuel dispensers.

Figure 2:
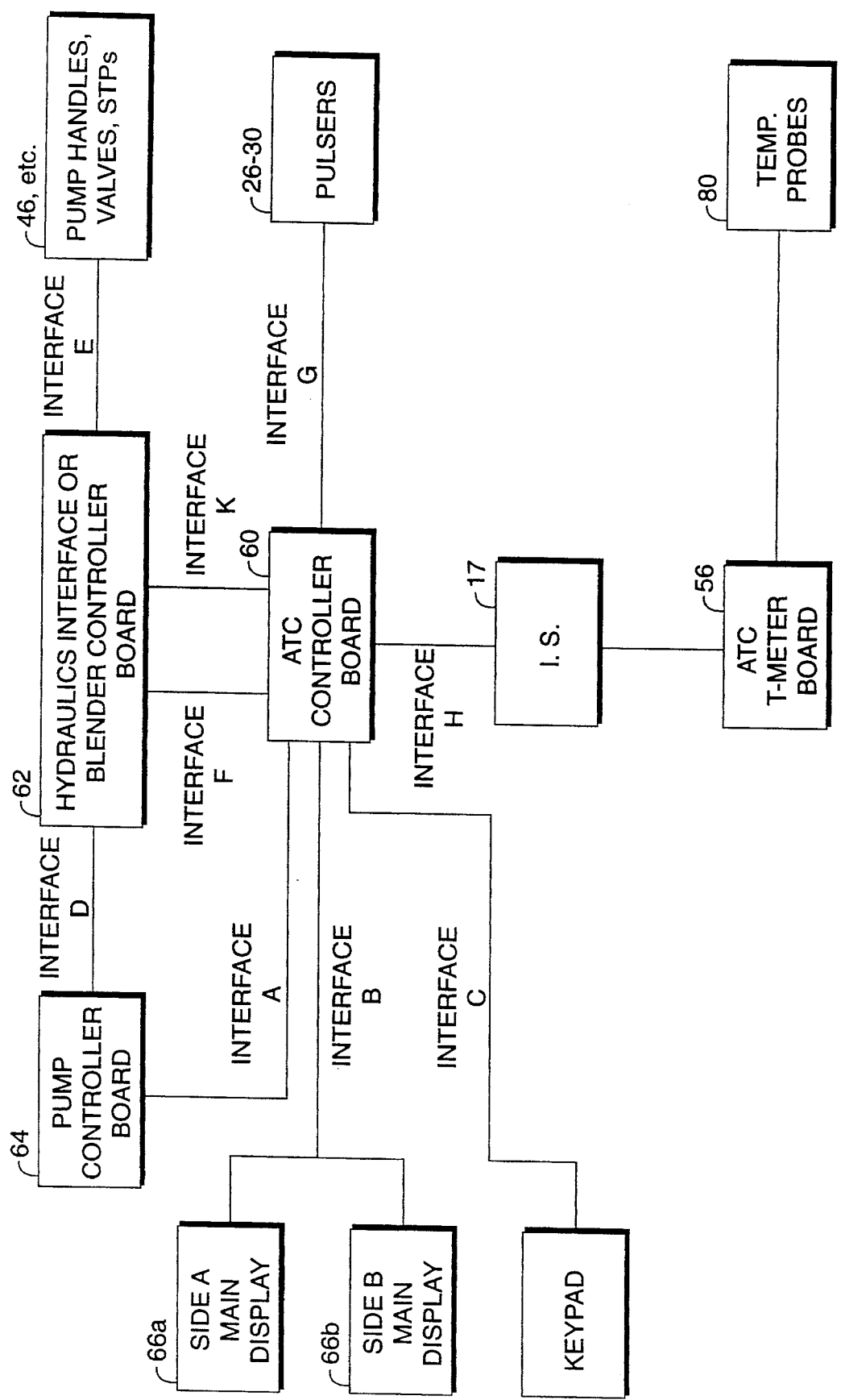
FIG. 2 is a block diagram of the major components of the temperature compensation system of the embodiment of FIG. 1.

FIG. 2 shows in block diagram form the important functional components of the automatic temperature compensation system. The temperature probes 80 imbedded in the metering devices 26–30 supply data to the T-meter board 56. Serial data is outputted through the intrinsically safe connection 17 to the ATC controller board 60. The ATC controller board 60 receives raw volumetric data from the pulsers 26–30. Board 60 takes the temperature data supplied from the T-meter board 56 to make corrections to the raw data from the pulsers 26–30 and supplies the corrected output to the displays 66a and 66b, according to the side of the dispenser housing 12 being accessed by a customer. The ATC controller board also communicates with the hydraulic interface or blender controller board 62, which in turn interfaces with pump controller board 64 in conventional fashion. The hydraulic interface board also interfaces with the handles 46, valves and the switch for the submerged turbine pumps in the underground tanks, from which the pipes 20–24 withdraw the liquid fuel.

FIG. 3 shows an improved meter 70 for use in the metering devices 26–30. The meter 70 is a conventional meter except that one of its end caps 74 has been modified to provide temperature measurement data. The cover 74 is cast with two built-in wells 76,78. A permanent well 76 is, in fact, an opening to the interior of meter 70, whereas the well 78 forms a hollow tube depending into the meter 70. A temperature sensor 80 is permanently secured in the well 76 to be directly exposed to the fuel as it flows through the meter 70. Thus, a direct measurement of the temperature of the fuel can be obtained by the sensor 80. The test well 78 is provided as a receptacle for a testing authority's thermometer. The test well 78 can be filled with a thermally conductive material to assure a good thermal connection between the thermometer and the housing to permit checks as to the accuracy of the temperature being provided by the sensor 80. This design is particularly useful because it permits easy retrofits of existing in-the-field meters.

The system will now be described with reference to the block diagram of FIG. 2, and with reference to technology already well-known to those of ordinary skill in the art in the form of existing THE ADVANTAGE® dispensers.

ATC Controller Board 60 controls all logical functions of the ATC system. It receives serial temperature data, encoded as a single pulse width per probe, from the T-Meter Board 56. This temperature data is used to compensate pulser data. Uncompensated pulses are received directly from the pulsers over lines 32–36 and shifted to CMOS logic levels. Compensated pulses are output to the Hydraulic Interface Board 62, after being level shifted back to near-normal pulser levels.

This board also interfaces to the displays 66a and 66b. It has control of the displays during ATC mode, and it allows the Pump Controller Board 64 to control the displays during normal mode.

Temperature measurement is controlled by the ATC T-Meter Board. It has the potential for monitoring from one to eight different product probes 80, plus a ninth probe for ambient temperature. The board sequentially measures the voltage across each one of the probes. This voltage and the output of a low-frequency sawtooth waveform generator are inputs to a comparator, whose output is a pulsewidth proportional to the voltage across the probe. This board also contains high-precision references for self-calibration.

The Pump Controller Board 64 receives compensated pulser data from the ATC Controller Board 60. This is the same controller board used in conventional Gilbarco THE ADVANTAGE® units. No changes in software or hardware need be made to the Pump Controller Board when interfaced with the ATC system.

In order to make the T-Meter Board and probes intrinsically safe, power supplied to the T-Meter Board from the ATC Controller Board, and the temperature data received back, IS passed through the intrinsically safe barrier 18. This barrier resembles the standard pulser is barriers of commercially available dispensers. Packaging for the T-Meter Board and probes would otherwise have to be explosion-proof and, consequently, very expensive.

Each probe 80 is installed in a product's path of flow in order to measure the temperature of the product. Each probe 80 uses a highly-accurate, almost linear RTD and four-wire method of measurement and is regularly scanned by the ATC T-Meter Board 56, which converts voltage measurements across the probes to time-domain pulsewidth temperature data.

The Hydraulics Interface Board 62 is used by the Pump Controller Board 64 in non-blending configurations to directly interface to and control the hydraulics. In the ATC system, pump handle signals are input directly to this board; however, the pulser data received are the compensated pulses output by the ATC Controller Board 60. Each of these sets of inputs are converted back to CMOS logic levels and then passed on to the Pump Controller Board 64. All other hydraulic control lines; i.e., valve and STP control, are passed directly from the Pump Controller Board to the Hydraulics Interface Board, as is conventional.

In a blending pump configuration, the Blender Controller Board exists in place of the Hydraulics Controller Board. Functionality with respect to the ATC system, however, remains constant. Pulses from low and high products from each side are fed directly to the ATC Controller Board, which level shifts down, compensates, then level shifts up the pulses as it would in a non-blender. Pulses are then fed to the Blender Controller Board. Submerged Turbine Pumps, proportional valves and pump handles are still managed directly by the Blender Controller Board.

Interface A

This interface contains display outputs from the Pump Controller Board to the ATC Controller Board, and Modular Keypad strobe outputs and scan inputs to the Pump Controller Board from the ATC Controller Board.

Interface B

The ATC Controller maintains ultimate control of the displays with this interface. Data signals and handshaking signals are just like those coming from the Pump Controller; however, the ATC Controller determines whether its own data or data from the Pump Controller gets sent to the Main Displays.

Interface C

This interface passes through the keypad strobe and return signals that are normally handled by the Pump Controller. However, the Modular Keypad is also used to control ATC functions. The ATC Controller board looks at the Pump Controller Board keypad signals, determines which key was pressed, and then takes over control of the displays if necessary.

Interface D

This interface contains all of the normal hydraulic signals between the Hydraulic Interface Board and Pump Controller Board. The pulser data transmitted here will have previously been compensated by the ATC Controller Board.

Interface E

This interface contains the standard pump handle signals, hydraulic control line signals and STP controls used on non-ATC Modular Electronics dispensers. Pulsers, however, are directly connected to the ATC Controller Board.

Interface F

This interface contains pulser data compensated by the ATC Controller Board, level shifted to resemble normal Hydraulic Interface Board inputs. Voltages is shifted high enough by the ATC Controller Board to reliably switch the input transistors on the Hydraulic Interface Board.

Interface G

These are the uncompensated pulser signals sent directly by the pulsers to the ATC Controller Board. These are the same pulser signals used by the Hydraulics Interface Board in a non-ATC THE ADVANTAGE® or modular dispenser, and are represented as lines 32–36 on FIG. 1.

Interface H

This is a single-channel "serial" interface between the ATC Controller Board and the ATC T-Meter Board, through which the T-Meter Board transmits temperature data to the controller as a pulse whose width is related to temperature. The T-Meter board continuously transmits a sequence of up to eleven pulses to the Controller Board. One pulse is sent per product temperature probe (up to eight max). An optional ninth pulse corresponds to the ambient temperature sensor. For a two-sided, two-product dispenser, there will be four product probes. Two high-precision reference data pulses shall also be transmitted via this interface to allow the ATC Controller to self-calibrate the system as potentially the tenth and eleventh pulses, respectively.

Interface K

This interface contains the grade authorization signals output from the Hydraulics Interface (Blender Controller) Board to the ATC Controller Board. During ATC Transaction Mode (see THE ADVANTAGE® ATC Software Functional Specification), the ATC Controller Board uses the pulser inputs to determine product selection, but uses grade authorization information to determine when the transaction is over.

T-METER BOARD 56

The T-meter board 56 sequentially reads up to 9 temperature probes 80 and 2 reference elements by applying a constant current and then measuring the voltage drop. The voltage drop is directly related to the resistance of the probe or element being measured at that time. The voltage drop is amplified and compared to a stable free-running ramp voltage to create a pulse width proportional to the amplified voltage drop. Each temperature probe and each of the two reference resistances create their own pulse width due to the conversion. The resulting pulses are sequentially output through external safety barrier 17.

In addition to the pulse-creating function described above, there is a probe current detector 100 which inhibits the creation of an output pulse when a current is not received from the probe being read.

The output pulses are assembled into a pulse train having a particular sequence for easy recovery. In the ATC system, the pulses are in the sequence: Low Reference, High Reference, Probe 1, Probe 2, Probe 3, . . . up to Probe 9. There is also a deadtime in the pulse train after the last probe which provides an additional key for sychronization at the receiver.

By setting up the system so that the pulse durations are typically 20 to 50 milliseconds, the system can be provided with a good degree of noise immunity. In a typical application, the data pulses are in a conduit with primary line voltages of 120 or 240 vac. Typically, line voltages carry transients which last for periods ranging from nanoseconds to microseconds. The ATC system data pulses can be heavily filtered to remove these noise pulses without substantially affecting the data. Since the filtering affects both the calibration pulses and the probe pulses in the same way, there is no net effect which can contaminate the validity of the data. For example, if the filtering action adds 50 microseconds to pulse duration, all pulses are extended by 50 microseconds, and the data contained in the relative ratios of the pulses will still be the same.

Other ranges of times for the pulsewidths could be used. For example, up to 15 milliseconds or even longer than 100 milliseconds. This could be done with tradeoffs in noise rejection at the fast end and throughput rate at the slow end.

Figure 4:
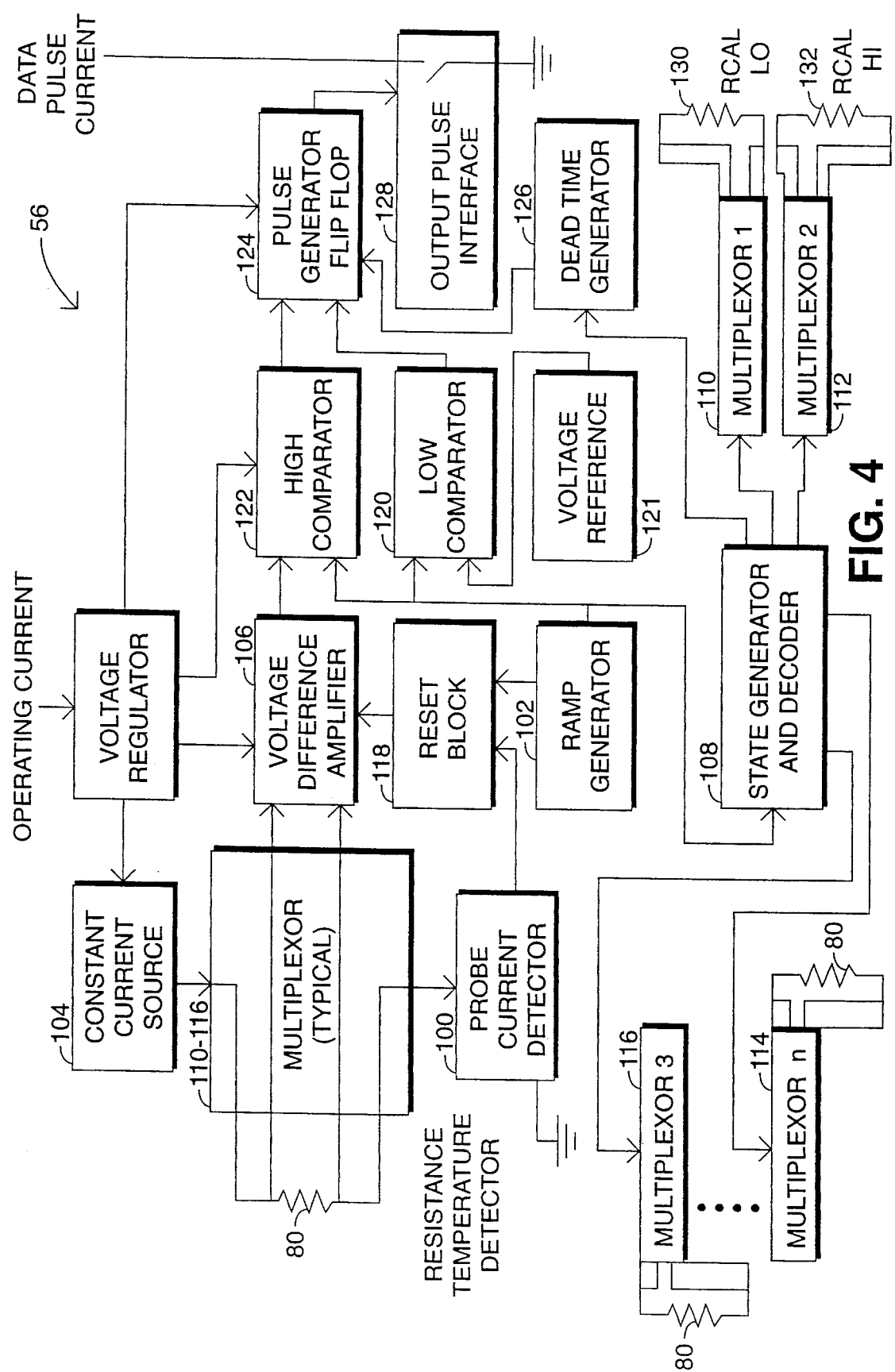
FIG. 4 is a block diagram of the components of the T-meter board of the embodiment of FIG. 1.

Referring to FIG. 4, which is a block diagram of the T-meter board 56, the Ramp Generator 102 utilizes an integrator to create a very linear ramp voltage. An output level detector senses high and low voltage conditions which provides an up/down control to control ramp direction.

Figure 7:
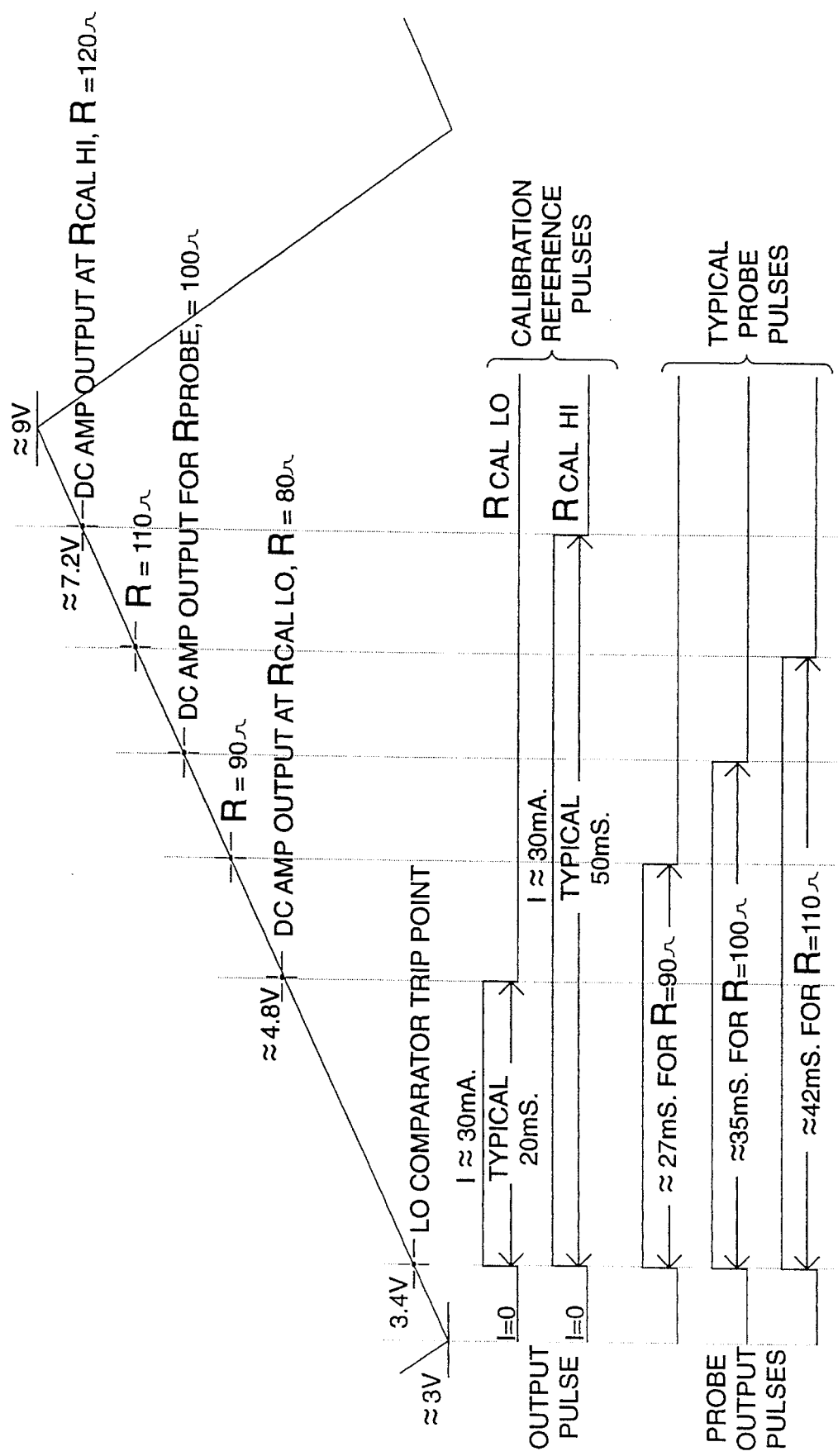
FIG. 7 is a timing diagram showing the generation of modulated pulse widths in the operation of the T-meter board.

The output of the ramp generator 102 is a ramp that rises for approximately 100 milliseconds, and falls for approximately 20 milliseconds. The bottom of the ramp is approximately 3 volts and the top of the ramp is approximately 9 volts. The ramp is free running, and not intentionally influenced by any external input. The ramp provides a mechanism for linear conversion frown voltage to time. In other words, the duration of time between two points on the ramp is proportional to the difference in voltage between the same two points on the ramp as seen in FIG. 7. The ramp must be stable in ramp rate over periods of seconds, but long term drifts over periods of hours or days are acceptable since the receiving system ignores the effect of slow drift.

A Current Source 104 provides a nominal 1 milliamp current regardless of load and is directed through a selected one of multiplexors 110,112,114,116 . . . according to the control of state generator and decoder 108.

Figure 6:
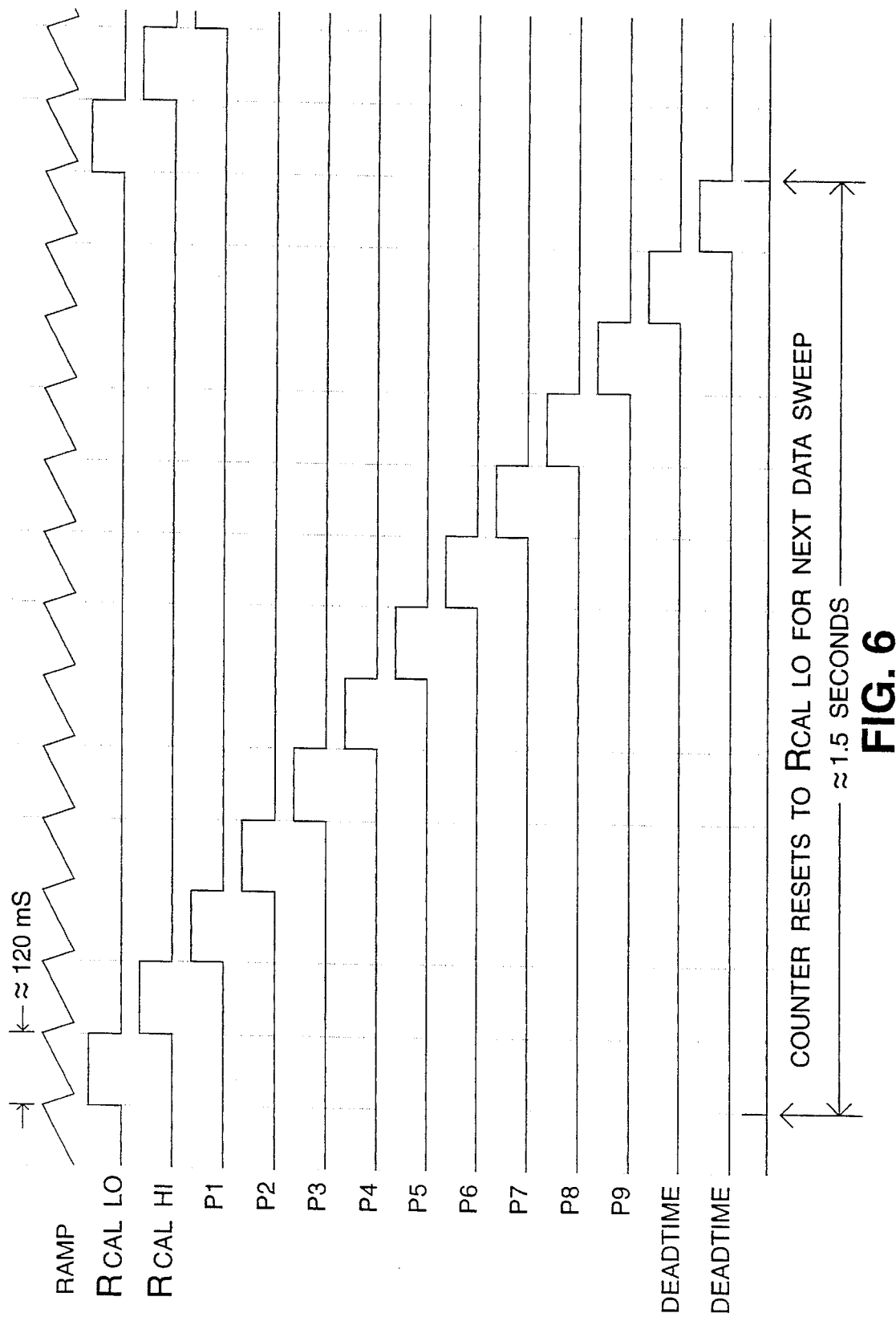
FIG. 6 is a timing diagram of operation of the T-meter board.

The State Generator and Decoder 108 receives a ramp direction control signal developed in the ramp generator 102, and transforms it into a digital signal by a Schmitt trigger, whose output is high during ramp time. When that output goes low at the end of each ramping up period, it triggers the clocking input of a binary counter, which advances a binary output. Therefore a timing sequence is developed for controlling the various multiplexors 110,112, 114,116 . . . , and for controlling the overall pulsing sequence in regards to dead time and the continuing process of creating a pulse train. The opening of a "window" for each of the referenced resistors and probes during sequential ramp cycles is depicted graphically in FIG. 6. During that window, the current from source 104 is directed to the chosen resistance, and resulting voltage drop is applied to amplifier 106.

Multiplexors 110,112,114,116 (and more as needed for one per probe and one each for the reference resistors) provide connections to each probe element or calibration resistor, depending upon the particular multiplexor. When the control inputs are low, the multiplexor functions as a 4 pole relay with open connections. When the control inputs are high, the multiplexor functions as a closed 4 pole relay. Under control of the State Generator and Decoder 108, one multiplexor at a time is enabled. When enabled, each multiplexor connects the current source, current return, +probe sense, and −probe sense in a 4 wire measurement configuration. This provides for the most accuracy in measuring the voltage drop across the resistive element being examined at any time, since the voltage drops in the current source and current return leads are excluded from the measurement.

The Rcal LO and Rcal HI Resistors 130,132 represent reference resistors which are used for system calibration. Rcal LO is chosen to be at the low end of the full scale temperature range, and Rcal HI is chosen to be at the high end of the full scale range. In the T-meter, Rcal LO is 80.1 ohm, and Rcal HI is 120.3 ohm, although other values could be used. The tolerance and stability of these resistors are selected based on the application, since the system accuracy and long term stability depend ultimately on these resistors. In the T-meter, these have 0.01% tolerance and 5 part per million temperature stability, yet they are available as commercial parts.

A Voltage Difference Amplifier 106 consists of an instrumentation amplifier with a dc voltage gain of approximately 60. There is filtering on both the input side and the output side of the amplifier stage to reduce susceptibility to noise. The amplifier recovers the measured dc voltage drop from the resistive element being sensed and amplifies the dc signal for further use. The input impedance of the amplifier is very high to prevent error effects due to lead resistance from the amplifier to the element. Since the nominal input is in the range of 80 to 120 millivolts dc, the corresponding output of the amplifier is in the range of 4.8 to 7.2 volts dc, during probe sense or resistive element sense.

Reset Block 118 resets the input and the output voltages of the amplifier block at the top of each ramp. At the end of every ramping up period, a negative pulse is coupled into the input of the Reset Block, which causes a momentary shorting of the input of the amplifier block, and discharge to ground of. This action insures that every new amplifier output is started at a nominal zero volt level. This clears out the voltage that was on the capacitors due to the last reading. In the event of a broken sense lead from the probe, the previous reading would continue to be read without this reset function.

The Reset Block is also activated by the detection of a missing probe, as sensed by the Probe Current Detector 100. This provides for holding down the amplifier output whenever the returned probe current does not meet nominal limits. This provides information to the system regarding faulty or missing probes.

The current which returns to the Probe Current Detector 100 from the probe 80 from its multiplexor must be at least a nominal 250 microamperes to turn on. In the event a probe is selected which has a broken lead in the source or return leg, the current detector responds by causing a reset to occur on the output of the amplifier for the duration of that multiplexor timing period.

The Low Comparator Block 120 includes a resistive divider. The voltage divider provides a nominal voltage of approximately 3.5 volts dc from block 121. The purpose of the Low Comparator block is to provide a consistent starting point for the output pulses which the T-meter board generates. The comparator compares the ramping voltage to the 3.5 volt level and outputs a 0 digital output when the ramp voltage is greater than 3.5 vdc, and a 1 digital output when the ramp voltage is less than 3.5 vdc. This method is used to create the starting point, because irregularities in ramp rate occur at the bottom of the ramp when the ramp changes direction.

The High Comparator Block 122 compares the output of the amplifier block to the ramp voltage and outputs a 1 digital output when the amplifier output voltage is greater than the ramp voltage, and a 0 digital output when the amplifier output voltage is less than the ramp voltage. The results of such a comparison for various probe resistances can be seen in FIG. 7.

Pulse Generator Flip Flop 124 responds to signals from the low and high comparators 120,122 to generate a high going pulse. The pulse begins at the point determined by the low comparator and terminates at the point determined by the high comparator. The low comparator sets the flip flop, and the high comparator resets the flip flop.

Dead Time Generator 126 is used for synchronizing the system which receives the data sweep. Every data sweep entails sequentially scanning each resistor or resistive element, followed by a dead time.

Output Pulse Interface 128 provides a low impedance path to ground, enabling current flow from an external circuit when the pulse generator sends a pulse to the output circuit. The duration of the current flow is directly related to the time period between the starting point on the ramp at 3.5 vdc, and the ending point on the ramp which is determined by the intersection of the ramp and the dc amplifier output. In this particular system, the output switches a nominal current of approximately 25 to 30 milliamperes.

Thus, the T-meter 56 outputs a pulse train over line 58, with the pulses in a prescribed sequence as set by the static generator and decoder 108. The pulses are of a width determined by the resistance of the selected probe 80 or reference resistors 130,132. The resistance of each probe 80 is, of course, highly dependent on the temperature of the meter in which it is installed.

Figure 5:
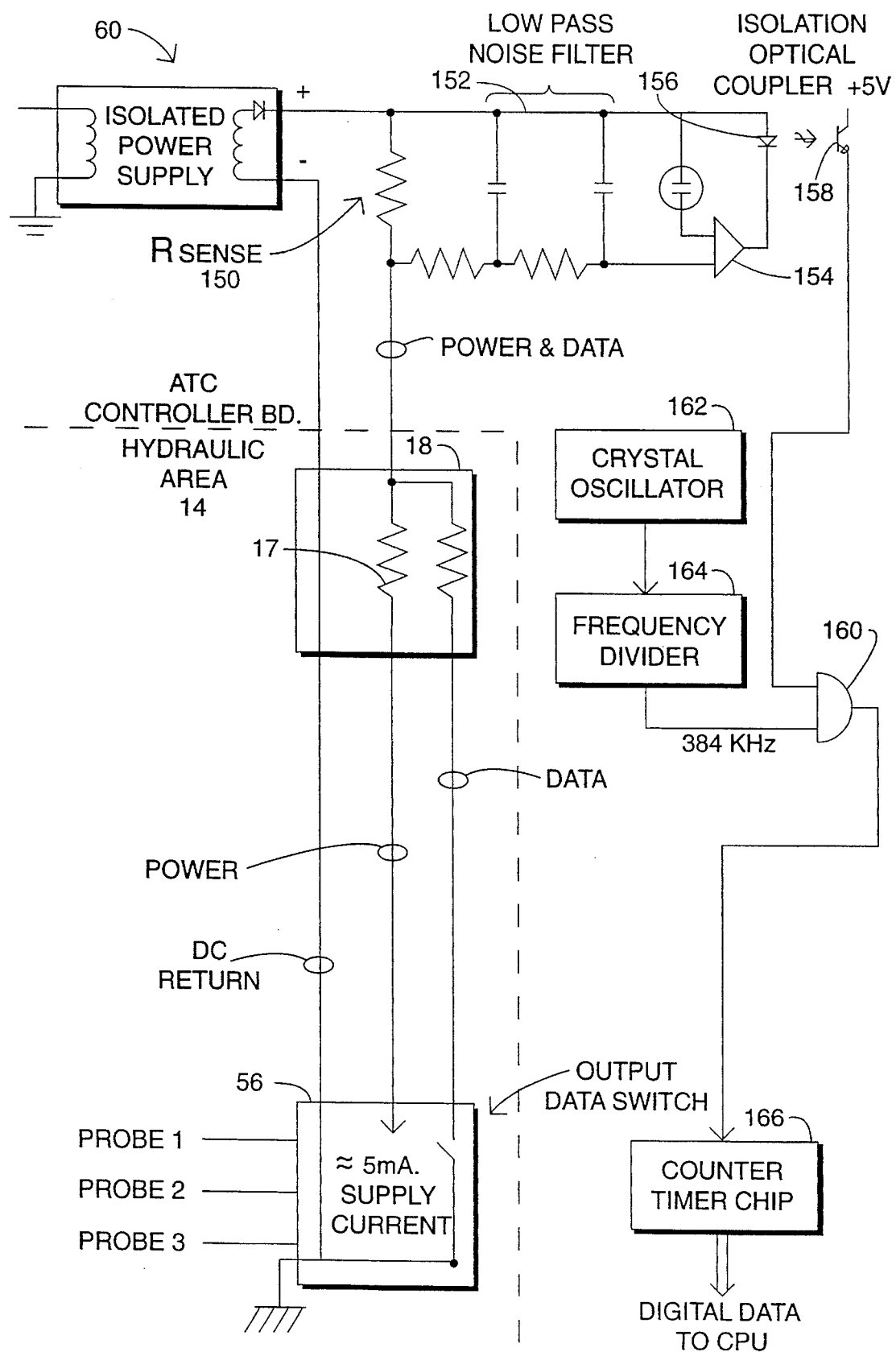
FIG. 5 is a block diagram of the interface between the T-meter board and the ATC controller.

Referring now to FIG. 5, the output of the T-meter Board 56 to the ATC Controller Board 60 will be explained. The combined T-meter supply current plus the switched data pulse current are monitored by the input current sense resistor 150. The voltage developed across the sense resistor is filtered by a low pass network 152 to remove noise components which are introduced in the data channel. In this case, the data channel is the conduit which also contains AC line voltage.

The filtered voltage is compared in comparator 154 to a reference voltage to determine if the received current is greater than a specified threshold level. The threshold current is chosen to be approximately midway between the T-meter supply current and the combination of the T-meter supply plus data pulse current.

When the received current is greater than the threshold current, the LED 156 in the optical coupler is energized. The optical coupler isolates the logic system from the receiving circuit front-end to provide both increased safety in the event of faults between the T-meter data lines and the AC wiring, and also to provide increased noise immunity for the noise on the AC line.

The phototransistor 158 in the optical coupler interfaces into the digital hardware. When the LED is on the phototransistor is also on, shunting the base of the discrete transistor to ground. The collector of the transistor is at a high state, which results in a high condition at the input of the AND gate 160 during this time.

Further, during this time, the AND gate 160 is receiving a 384 KHZ clock signal from oscillator 162 and frequency divider 164. As a result the AND gate produces an output pulse train of 384 KHZ whenever the total data current exceeds the threshold current. The number of cycles in the pulse train is counted by the counter 166, and the period between pulse trains is also measured to determine the presence of dead time for synchronization purposes.

The value of probe resistance is extracted by collecting and processing the counts for the Rcal LO, Rcal HI, and any other probes which are connected. The probe resistance in ohms is determined by solving the following equation based on proportionality and interpolation:

$$R_{Probe} = Rcal\ LO + \frac{(Count\ of\ Probe - Count\ of\ Rcal\ LO)}{(Count\ of\ Rcal\ HI - Count\ of\ Rcal\ LO)} \times (Rcal\ HI - Rcal\ LO)$$

The values of Rcal LO and Rcal HI are stored in the ATC controller board memory and reflect the value of Rcal LO and Rcal HI reference resistors that are built into the T-meter board. The result of this calculation is a very accurate value for probe resistance based on the proportionality information encoded in the signals and the known ohmic values for the reference resistors, Rcal LO and Rcal HI. This calculation is performed after each new probe pulse is received. As a result, a new $R_{Probe}$ resistance is accurately determined at approximately 1 to 1.5 second intervals for each probe.

Next, the $R_{Probe}$ resistance value is used as an input to a lookup table on the ATC Board, which converts resistance to temperature. (Note that Rcal lo and Rcal hi are not used at all in this step.) The use of the lookup table removes error caused by non-linearity of the resistance probes 80 over the expected temperature range. A simple mathematical interpolation is performed between lookup table data points, based on the previously calculated probe resistance $R_{Probe}$ to arrive at a highly accurate temperature value. The temperature is then used in a conversion process which either adds or subtracts events in the fuel flow counting process to temperature compensate the reported fuel transaction.

The overall merits of the ATC system described here are comparative ease of installation in either new builds or retrofits, a method of sensing which inherently maintains accuracy with minimal drift, and a method of conveying several accurate readings through an intrinsic safety barrier with minimal effect due to the barrier.

The ATC sensing system described here removes essentially all effects of drift over time and temperature. The system accomplishes this by sending reference readings along with the various temperature probe readings. This process provides for the correct interpretation of all of the readings by using the stable references as guidelines. Another benefit of this approach is that the system does not require calibration, and so it cannot become uncalibrated.

While the invention has been described with reference to a particular embodiment, those of ordinary skill in the art will understand that various modifications and refinements can be made and still fall within the scope of the claims.

What is claimed is:

1. An apparatus for dispensing a liquid fuel and measuring the amount dispensed according to a temperature-corrected volumetric measure comprising a housing having a fuel-handling compartment and an electronics compartment and a barrier between said fuel handling compartment and said electronics compartment, a plurality of fuel passageways through said fuel-handling compartment, each said passageway having a flow meter to measure the volume of fuel flowing through said passageway and a thermometric probe adapted to read the temperature of fuel flowing through said passageway, each of said meters being connected by a first electrical circuit to pass an electrical signal representative of the volumetric flow though its respective passageway to said electronics compartment, each of said probes being connected by a second electric circuit to pass an electrical signal representative of the temperature of the probe onto said second circuit, said second circuit having one intrinsically safe passage through said barrier to said electronics compartment, and electronics in said electronics compartment including a computation device connected to said circuits to receive said electric signals and to modify the electrical signal representative of the volumetric flow to account for temperature.

2. An apparatus as claimed in claim 1 wherein said flow meters include a meter housing and said thermometric probe is mounted in a removable endwall of said meter housing.

3. An apparatus as claimed in claim 2 wherein said endwall also includes a well adapted to receive a second probe to check the accuracy of the first-mentioned probe in the endwall.

4. An apparatus as claimed in claim 1 wherein said probe is an RTD probe.

5. An apparatus as claimed in claim 1 further comprising an electronics package electrically connected to said probes and to reference resistors to sequentially pass a pulse of current from a current source through each of said probes and said resistors to generate data and reference signals.

6. An apparatus as claimed in claim 5 wherein said electronics package multiplexes the data and reference signals for transmission to said electronics compartment.

7. An apparatus as claimed in claim 5 wherein said electronics package converts said data and reference signals to a pulse-width modulated form.

8. An apparatus as claimed in claim 7 wherein the pulses of the converted data and reference signals are on the order of 20–50 milliseconds long.

9. An apparatus as claimed in claim 7 wherein said electronics compartment includes an electrical filter to filter high frequency transients from said data and reference signals.

10. An apparatus as claimed in claim 5 wherein there are at least four of said probes electrically connected to said electronics package.

11. An apparatus as claimed in claim 5 wherein said electronics package includes a sawtooth waveform generator and a comparator to permit the comparison of the voltage across one of said probes with a sawtooth waveform to generate pulses of a length derived from the resistance of the probe.

12. An apparatus as claimed in claim 5 wherein said data and reference signals are transmitted to said electronics compartment.

13. An apparatus as claimed in claim 5 wherein one of said reference resistors has a resistance corresponding to the resistance of said probes at an extreme end of a range of expected temperatures.

14. An apparatus as claimed in claim 13 wherein the other of said reference resistors has a resistance corresponding to the resistance of said probes at an opposite extreme end of said range of expected temperatures.

15. An apparatus as claimed in claim 14 wherein said data and reference signals are transmitted to said electronics compartment and the temperatures of the probes are computed by interpolation of the data signals and the reference signals.

16. An apparatus as claimed in claim 15 wherein said data and reference signals are applied to a lookup table to remove error from non-linearity of said probes' resistance.

17. An apparatus as claimed in claim 1 wherein said electronics compartment includes a lookup table and said electric signals include data and reference signals which are applied to said lookup table to remove error from non-linearity of said probes' resistance.

18. An apparatus for dispensing a liquid fuel and measuring the amount dispensed according to a temperature-corrected volumetric measure comprising a housing having a fuel-handling compartment and an electronics compartment and a barrier between said fuel handling compartment and said electronics compartment, a plurality of fuel passageways through said fuel-handling compartment, each said passageway having a flow meter to measure the volume of fuel flowing through said passageway and a thermometric RTD probe adapted to read the temperature of fuel flowing through said passageway and a meter housing having a removable endwall, said endwall having a situs for said thermometric probe and a well adapted to receive a second probe to check the accuracy of the first-mentioned probe in the endwall, each of said meters being connected by a first electrical circuit to pass an electrical signal representative of the volumetric flow though its respective passageway to said electronics compartment, each of said probes being connected by a second electric circuit to pass an electrical signal representative of the temperature of the probe onto said second circuit, said second circuit having an intrinsically safe passage through said barrier, and electronics in said electronics compartment including a computation device connected to said circuits to receive said electric signals and to modify the electrical signal representative of the volumetric flow to account for temperature.

19. An apparatus for dispensing a liquid fuel and measuring the amount dispensed according to a temperature-corrected volumetric measure comprising a housing having a fuel-handling compartment and an electronics compartment and a barrier between said fuel handling compartment and said electronics compartment, at least fuel passageways through said fuel-handling compartment, each said passageway having a flow meter to measure the volume of fuel flowing through said passageway and a thermometric probe adapted to read the temperature of fuel flowing through said passageway, each of said meters being connected by a first electrical circuit to pass an electrical signal representative of the volumetric flow though its respective passageway to said electronics compartment, each of said probes being connected by a second electric circuit to pass an electrical signal representative of the temperature of the probe onto said second circuit, reference resistors having a resistance corresponding to the resistance of said probes at extreme ends of a range of expected temperatures and connected by said second circuit to pass an electrical signal representative of the temperature extremes onto said second circuit, an electronics package electrically connected to said probes and to reference resistors to sequentially pass a pulse of current from a current source through said second circuit and each of said probes and said resistors to generate data and reference signals, a sawtooth waveform generator and a comparator to compare the voltage across one of said probes with a sawtooth waveform to generate pulses of a length derived from the resistance of the probe to convert said data and reference signals to a pulse-width modulated from with the pulses of the converted data and reference signals on the order of 20–50 milliseconds long, multiplex the data and reference signals for transmission to said electronics compartment by one intrinsically safe passage through said barrier, and electronics in said electronics compartment including an electrical filter to filter high frequency transients from said data and reference signals, a computation device including a lookup table connected to said circuits to
  derive a signal of the temperature of the probes by interpolation of the data signals and the reference signals,
  apply said data and reference signals to a lookup table to remove error from non-linearity of said probes' resistance, and
  modify the signal representative of the volumetric flow to account for temperature.

20. An apparatus for dispensing a liquid fuel and measuring the amount dispensed according to a temperature-corrected volumetric measure comprising a fuel dispenser housing, a plurality of fuel passageways through said housing, each said passageway having a flow meter to measure the volume of fuel flowing through said passageway and a thermometric probe adapted to read the temperature of fuel flowing through said passageway, each of said meters being connected by a first electrical circuit to pass a signal representative of the volumetric flow though its respective passageway, each of said probes being connected by a second electric circuit to pass an electrical signal representative of the temperature of the probe onto said second circuit, electronics including a pulse width modulator connected to said second circuit to convert electrical signals representative of the temperatures of the probes to a pulse width modulated data stream, and a computation device to receive said pulse width modulated data stream and to modify the electrical signal representative of the volumetric flow to account for temperature.

21. An apparatus as claimed in claim 20 wherein said pulse width modulator is electrically connected to said probes and to reference resistors having resistances corresponding to the resistance of said probes at an extreme end of a range of expected temperatures and said computation device computes temperatures of the probes by interpolation of the data signals and the reference signals.

22. A method of dispensing liquid fuel and measuring the amount dispensed according to a temperature-corrected volumetric measure comprising passing the fuel through one of a plurality of fuel passageways in a hazardous area of a fuel dispenser, generating a signal representative of the volume of flowing fuel in the passageway, generating a signal representative of the temperature of fuel flowing through the passageway, passing the signal representative of the fuel temperature each said passageway through an intrinsically safe passage through one barrier to a non-hazardous area, and modifying the signal representative of the volumetric flow to account for temperature.

23. A method as claimed in claim 22 further comprising temporarily inserting a temperature probe juxtaposed the passageway to check the accuracy of the signal representative of the temperature of fuel flowing through the passageway.

24. A method as claimed in claim 22 further comprising sequentially passing a pulse of current from a current source through each of several probes and reference resistors to generate data signals representative of the temperature of fuel flowing through the passageway and other passageways and to generate reference signals.

25. A method as claimed in claim 24 further comprising multiplexing the data and reference signals for transmission through the intrinsically safe passage through the barrier to the non-hazardous area.

26. A method as claimed in claim 24 wherein said modifying step includes deriving a signal of the temperature of the probes by interpolation of the data signals and the reference signals and applying the temperature signal to a lookup table to remove error from non-linearity of the probes' resistance.

27. A method as claimed in claim 24 further comprising converting the data and reference signals to a pulse-width modulated form.

28. A method as claimed in claim 24 further comprising converting the data and reference signals to a pulse-width modulated form with the pulses on the order of 20–50 milliseconds long.

29. A method as claimed in claim 28 further comprising filtering high frequency transients from said data and reference signals in the non-hazardous area.

30. A method as claimed in claim 24 wherein said sequential passing step comprises passing current pulses through at least four probes.

31. A method as claimed in claim 24 further comprising generating a sawtooth waveform and comparing the voltage across the probes with a ramp voltage of the sawtooth waveform to generate pulses of a length derived from the resistances of the probes.

32. A method as claimed in claim 24 wherein the passing step comprises transmitting the data and reference signals to the non-hazardous area.

33. A method as claimed in claim 24 wherein the step of passing a current pulse through the reference resistors generates a voltage corresponding to the voltage across one of said probes at an extreme end of a range of expected temperatures.

34. A method as claimed in claim 33 wherein the step of passing a current pulse through the reference resistors generates a voltage corresponding to the voltage across one of said probes at an other end of a range of expected temperatures.

35. A method as claimed in claim 34 comprising computing the temperatures of the probes by interpolation of the data signals and the reference signals.

36. A method as claimed in claim 35 wherein said modifying step includes deriving a signal of the temperature of the probes by interpolation of the data signals and the reference signals and applying the temperature signal to a lookup table to remove error from non-linearity of the probes' resistance.

37. A method of dispensing liquid fuel and measuring the amount dispensed according to a temperature-corrected volumetric measure comprising passing the fuel through one of a plurality of fuel passageways in a hazardous area of a fuel dispenser, generating a signal representative of the volume of flowing fuel in the passageway, sequentially passing a pulse of current from a current source through each of a plurality of probes having resistances that vary with temperature and two reference resistors to generate data signals representative of the temperature of fuel flowing through the passageway and other passageways and to generate reference signals, with the current pulse through the reference resistors generating voltages corresponding to the voltage across the probes at the extreme ends of a range of expected temperatures, comparing the voltage across the probes with a ramp voltage of a sawtooth waveform to generate pulses of a length derived from the resistances of the probes and on the order of 20–50 milliseconds long, multiplexing the data and reference signals for transmission through one intrinsically safe passage through the barrier to a non-hazardous area, filtering high frequency transients from said data and reference signals in the non-hazardous area, computing the temperatures of the probes by interpolation of the data signals and the reference signals, applying the temperatures to a lookup table to remove error from non-linearity of the probes' resistance, and modifying the signal representative of the volumetric flow to account for temperature.

38. An apparatus as claimed in claim 1 wherein said thermometric probe is mounted in said meter.

39. An apparatus for dispensing a liquid fuel and measuring the amount dispensed according to a temperature-corrected volumetric measure comprising a housing having a fuel-handling compartment and an electronics compartment and a barrier between said fuel handling compartment and said electronics compartment, a plurality of fuel passageways through said fuel-handling compartment, each said passageway having a flow meter to measure the volume of fuel flowing through said passageway and a thermometric probe adapted to read the temperature of fuel flowing through said passageway, each of said meters being configured to pass an electrical signal representative of the volumetric flow though its respective passageway to said electronics compartment, each of said probes being configured to pass an electrical signal representative of the temperature of the probe to an electronics package, said electronics package configured to provide a consolidated output signal representing the temperature of each said probe and pass said output signal through an intrinsically safe barrier to said electronics compartment, and electronics in said electronics compartment including a computation device connected to said circuits to receive said electric signals representative of the volumetric flow and said output signal and to modify the electrical signal representative of the volumetric flow to account for temperature.

40. An apparatus as claimed in claim 39 wherein said electronics package is in said fuel-handling compartment.

41. An apparatus as claimed in claim 39 wherein said output signal is a serial data signal.

42. An apparatus as claimed in claim 39 wherein said electronics package is electrically connected to said probes and to reference resistors to sequentially pass a pulse of current from a current source through each of said probes and said resistors to generate data and reference signals.

43. An apparatus as claimed in claim 42 wherein said electronics package converts said data and reference signals to a pulse-width modulated form.

44. An apparatus as claimed in claim 43 wherein said electronics compartment includes an electrical filter to filter high frequency transients from said data and reference signals.

45. An apparatus as claimed in claim 42 wherein said electronics package includes a sawtooth waveform generator and a comparator to permit the comparison of the voltage across one of said probes with a sawtooth waveform to generate pulses of a length derived from the resistance of the probe.

46. An apparatus as claimed in claim 42 wherein one of said reference resistors has a resistance corresponding to the resistance of said probes at an extreme end of a range of expected temperatures.

47. An apparatus as claimed in claim 46 wherein the other of said reference resistors has a resistance corresponding to the resistance of said probes at an opposite extreme end of said range of expected temperatures.

48. An apparatus as claimed in claim 39 wherein said electronics compartment includes a lookup table and said electric signals include data and reference signals which are applied to said lookup table to remove error from nonlinearity of said probes' resistance.

49. An apparatus for dispensing a liquid fuel and measuring the amount dispensed according to a temperature-corrected volumetric measure comprising a housing having a fuel-handling compartment and an electronics compartment and a barrier between said fuel-handling compartment and said electronics compartment, a plurality of fuel passageways through said fuel-handling compartment, each said passageway having a flow meter to measure the volume of fuel flowing through said passageway and a thermometric probe adapted to read the temperature of fuel flowing through said passageway, each of said meters being configured to provide an electrical signal representative of the volumetric flow though its respective passageway, each of said probes having a resistive element which is variable with temperature and electrically connected to an electronics package, said electronics package being configured to
obtain a signal indicative of probe temperature,
convert each said signal into a pulse having corresponding proportional pulse width, and
transmit said pulses over one intrinsically safe passage through said barrier to said electronics compartment, said electronics compartment including a computation device connected to said circuits to receive said electric signals representative of the volumetric flow and said pulses to modify the electrical signal representative of the volumetric flow to account for temperature.

50. An apparatus as claimed in claim 49 wherein said electronics package includes a current source for generating a voltage across each said resistive element.

51. An apparatus as claimed in claim 50 wherein said electronics package further includes a ramp generator for generating a voltage ramp and a comparator circuit for comparing the voltage across each said resistive element and the voltage ramp, said comparator having an output providing said pulses.

52. An apparatus as claimed in claim 49 further including reference resistors having fixed resistive elements.

53. An apparatus as claimed in claim 49 wherein one said reference resistor's resistive element corresponds to the resistance of said probes' resistive element at an extreme end of a range of temperature.

54. An apparatus as claimed in claim 53 wherein one said reference resistor's resistive element corresponds to the resistance of said probes' resistive element at an opposite extreme end of a range of temperature.

55. An apparatus as claimed in claim 49 wherein said electronics package assembles a pulse train from each said pulse width and transmits said pulse train through said barrier to said electronics compartment.

* * * * *

UNITED STATES PATENT AND TRADEMARK OFFICE
CERTIFICATE OF CORRECTION

PATENT NO. : 5,557,084
DATED : September 17, 1996
INVENTOR(S) : Howard M. Myers et al.

It is certified that error appears in the above-indentified patent and that said Letters Patent is hereby corrected as shown below:

In Claim 19, line 8 after least, insert the word "four."

In Claim 19, line 34 after modulated, from should be "form."

Signed and Sealed this

Sixteenth Day of September, 1997

Attest:

BRUCE LEHMAN

*Attesting Officer*    *Commissioner of Patents and Trademarks*